(12) United States Patent
Berlusconi et al.

(10) Patent No.: US 10,924,662 B2
(45) Date of Patent: Feb. 16, 2021

(54) SYSTEM FOR GENERATING A VIRTUAL MODEL OF AT LEAST PART OF THE BODY OF A USER OR AT LEAST PART OF AN OBJECT

(71) Applicant: IGOODI SRL, Milan (IT)

(72) Inventors: Davide Luigi Berlusconi, Milan (IT); Nicoló Spallarossa, Genoa (IT); Luca Dallepiane, Genoa (IT)

(*) Notice: Subject to any disclaimer, the term of this patent is extended or adjusted under 35 U.S.C. 154(b) by 0 days.

(21) Appl. No.: 16/616,485

(22) PCT Filed: May 31, 2018

(86) PCT No.: PCT/IB2018/053886
§ 371 (c)(1),
(2) Date: Nov. 24, 2019

(87) PCT Pub. No.: WO2018/220575
PCT Pub. Date: Dec. 6, 2018

(65) Prior Publication Data
US 2020/0177800 A1    Jun. 4, 2020

(30) Foreign Application Priority Data

May 31, 2017 (IT) .......................... 102017000059481

(51) Int. Cl.
| | |
|---|---|
| *H04N 5/232* | (2006.01) |
| *H04N 5/247* | (2006.01) |
| *H04N 5/225* | (2006.01) |
| *G06T 7/55* | (2017.01) |
| *G06T 17/00* | (2006.01) |
| *G06Q 30/06* | (2012.01) |

(52) U.S. Cl.
CPC .......... *H04N 5/23222* (2013.01); *G06T 7/55* (2017.01); *G06T 17/00* (2013.01); *H04N 5/2256* (2013.01); *H04N 5/247* (2013.01); *G06Q 30/0643* (2013.01); *G06T 2200/24* (2013.01); *G06T 2207/30196* (2013.01)

(58) Field of Classification Search
None
See application file for complete search history.

(56) References Cited

U.S. PATENT DOCUMENTS

| | | |
|---|---|---|
| 2013/0225305 A1 | 8/2013 | Yang |
| 2016/0093085 A1* | 3/2016 | Ray ...................... A61B 5/1072 345/419 |

FOREIGN PATENT DOCUMENTS

| | | |
|---|---|---|
| EP | 1903509 | 3/2008 |
| GB | 2281540 | 3/1995 |
| WO | 2014183157 | 11/2014 |

* cited by examiner

*Primary Examiner* — Michelle Chin
(74) *Attorney, Agent, or Firm* — Themis Law

(57) ABSTRACT

A system for generation of a virtual template of at least one part of the body of a user includes an acquisition unit, which has a structure defining an acquisition chamber and includes a plurality of image capture devices such as cameras or the like. Such structure has a frame that supports a plurality of panels, each panel having a corresponding image capture device arranged thereon facing the acquisition chamber, the panels being arranged to shape the acquisition chamber like an egg.

9 Claims, 8 Drawing Sheets

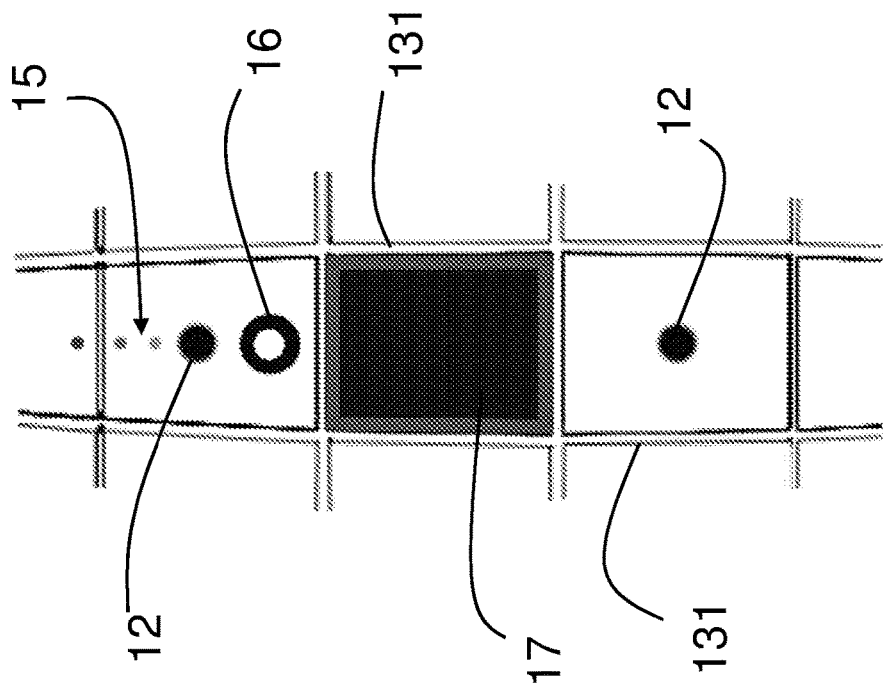
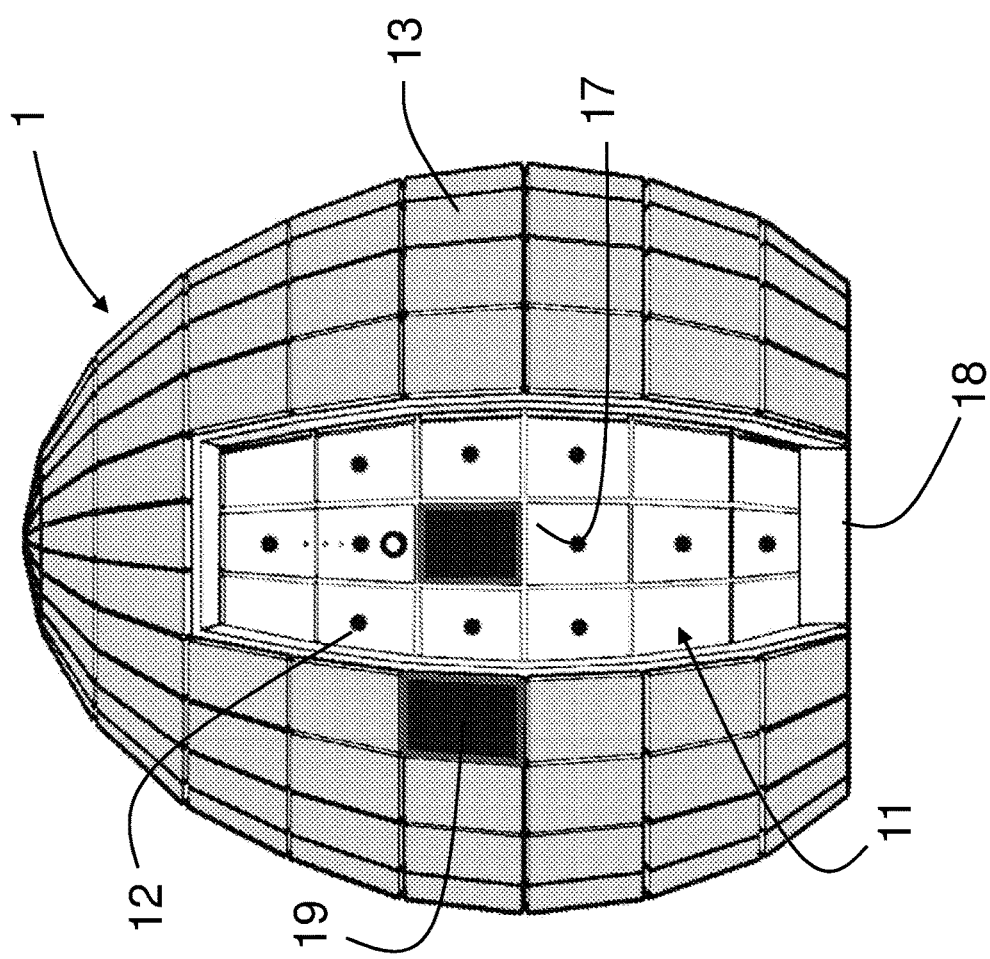

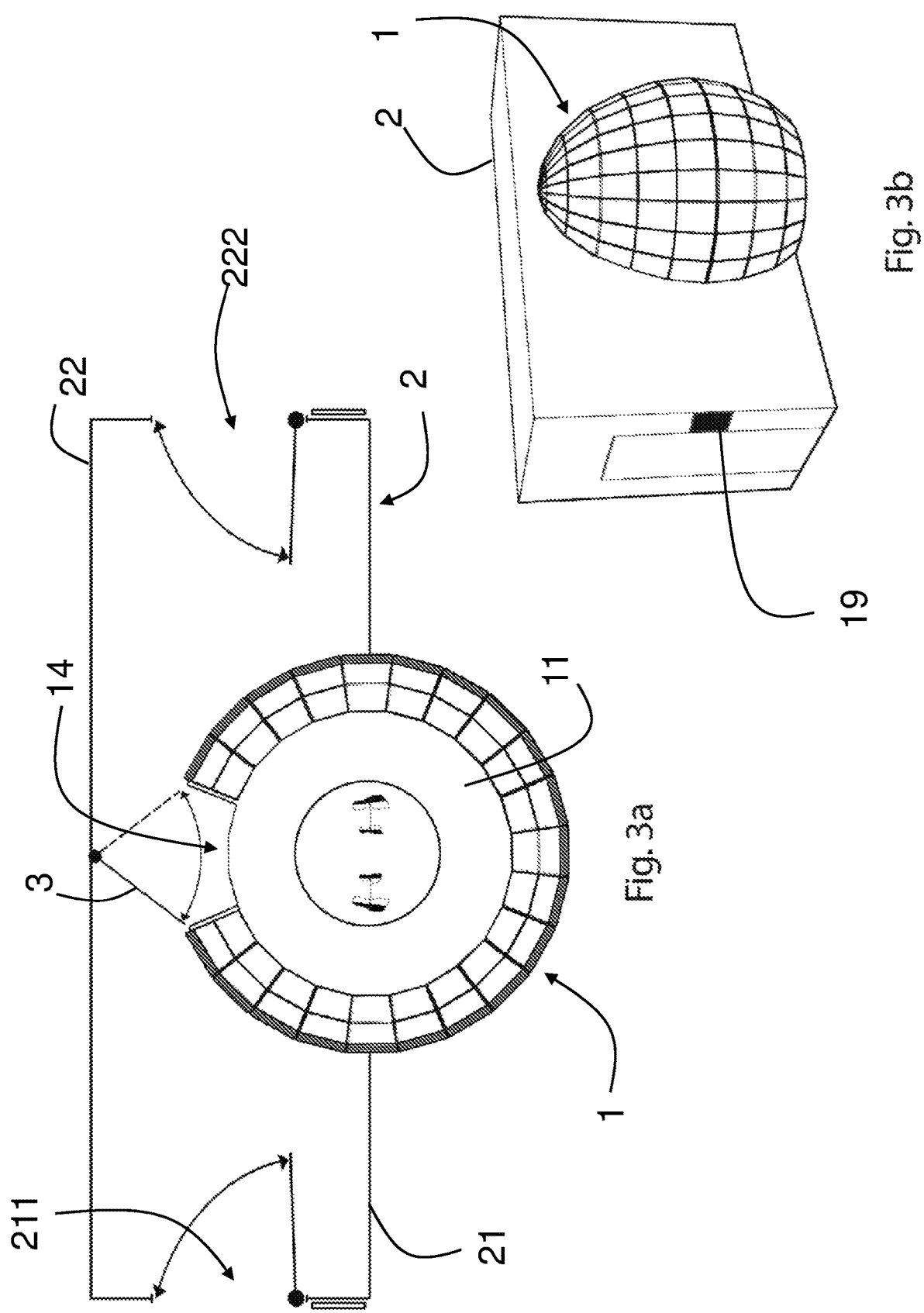

SYSTEM FOR GENERATING A VIRTUAL MODEL OF AT LEAST PART OF THE BODY OF A USER OR AT LEAST PART OF AN OBJECT

The present invention relates to a system for generation of a virtual template of at least one part of the body of a user or at least one part of an object.

The system comprises at least one acquisition unit consisting of a structure defining an acquisition chamber, said structure comprising a plurality of image capture devices such as cameras or the like.

The configuration just described above is the common configuration of systems known in the art which can detect any parameter of the body of a user and store it into a remote unit for subsequent analysis, processing, etc.

Such systems are known and widely used in the most diverse fields, especially in medical field.

Examples of such systems are, e.g., ultrasound systems comprising a probe to detect certain parameters of a body and transmit them to a remote unit in order to visualize these parameters or for diagnostic purposes.

Use of the Internet has prompted the development of such systems, especially in medical field, in order to ensure an enhanced interaction between doctor and user up to such an extent as to enable remote diagnostics.

Furthermore, remote diagnostics increasingly finds application on web platforms, online forums and social networks wherein a community of users can discuss the results and debate on the basis of their different skills and competences.

Such a development has been observed not only in medical field but also in all the systems which can detect data from a user and then store them into private or public areas on a network or into remote units.

Unfortunately, even though these systems have been established and developed, systems known in the art appear to be very specific both in terms of field of application and in terms of type of data which can be collected by the acquisition unit.

Indeed, there is apparently no system which can provide a more comprehensive view of user data in order to enable an overall management thereof and which can be incorporated into websites, such as social networking websites, which are generally visited by a user.

Furthermore, also in the light of the numerous applications, the data acquisition system market is experiencing an increasing demand for an enhanced definition of virtual templates, i.e. templates having increasingly accurate details, in order to accommodate the requirements of different uses.

Accordingly, there is a need—not satisfied by systems known in the art—for a system for generation of a virtual template of at least one part of the body of a user which can overcome the disadvantages of the systems known in the art as described above.

The present invention achieves the above objects by providing a system as described above, wherein said structure consists of a frame for supporting a plurality of panels, each panel having arranged thereon a corresponding image capture device facing the acquisition chamber.

Furthermore, the panels are arranged in such a way that the acquisition chamber is shaped as an egg.

The specific egg-shape—which will be illustrated later—can optimize the number of image capture devices required to obtain a three-dimensional template with high accuracy and detail resolution.

In fact, the image capture devices lie on different planes in order to obtain different views of the body of the user and increase details thereof.

Particularly, the cameras are fixedly arranged on the panels so as to capture images from different angles in order to optimize quality with respect to the number of cameras.

The ability to obtain an accurate template from a user results in several advantages also depending on the field of application.

For example, with reference to fashion and online shopping fields: the accuracy of the measurements made by the acquisition unit allows the size of a dress or garment to be appropriately evaluated for online purchase from the comfort of home without the need for going to a store.

This feature is particularly advantageous, especially considering that current estimates suggest that about 30% of online purchase items are returned to supplier because of improper choice of size.

Additionally, the system according to the present invention would prevent a user from purchasing an item and then returning it invoking the size as a justification while the real reason is merely that he/she didn't appreciate the item.

In fact, the ability to accurately choose the size would result in an advantage for suppliers which would minimize the items returned by users.

The advantageous aspects of the system according the present invention are not limited to fashion and online shopping fields but extend to the most disparate fields—from medical field up to video-game world.

As will be seen hereinbelow from the description of some embodiments, the system according to the present invention enables the creation of a platform for managing the profile of each user: in fact, the virtual template, i.e. the avatar generated by the acquisition unit, can be associated with any data available for the user, both data related to the profile of the user on various social networks and, if available, institutional data related to residential address, tax code, etc.

Accordingly, one of the aims of the system according to the present invention is to provide a platform for managing the profiles of various users in order to facilitate the access to online services and shopping stores.

It should be noted that the scanning process can be applied to the body of a user who may be a human or animal.

In exactly the same way, i.e. without changing the features of the system according to the present invention, the scanning process can also be applied to an object.

In order to further increase the definition of the virtual template and improve the capture capability of the image capture devices, some of the panels are advantageously provided with a light source.

It should be noted that the image capture devices may be of any kind known in the art, such as for example digital cameras, SRL cameras or video cameras.

According to a further improvement of the configuration just described above, the light source consists of luminous members arranged at the edges of the panels.

For example, some or all the panels can be provided with LED strips surrounding the periphery thereof.

As will be apparent from the description of some exemplary embodiments, the interior of the acquisition chamber is advantageously provided with a unit adapted to give instructions to the user in order to optimize the whole process of capture of an image of the body of the user and creation of a three-dimensional template.

To this end, at least one panel is provided with an interface unit.

In addition, according to an improvement, at least one panel is provided with an indicator member adapted to indicate to the user the proper positioning within the acquisition chamber.

This configuration is advantageously combined with a control unit which communicates with a unit for operating the image capture devices.

The control unit has processor means configured to run a logic program which comprises the following steps:
b) activating the image capture devices,
c) generating a virtual template of said user.

Step b) is preceded by a step a) of generating instructions for the user to obtain a proper positioning of the user within the acquisition chamber.

This allows the acquisition procedure to be improved: time requirement, is reduced and virtual template of the user can be reliably obtained with a high resolution.

These advantageous aspects can be further improved by providing an automatic image capture step, i.e. a step in which the image capture devices are activated automatically as soon as the user is positioned optimally.

To this aim, in a preferred embodiment of the system according to the present invention, step a) comprises the following sub-steps:
a1) generating a shape adapted to define an acquisition zone,
a2) visualizing both said shape and a real-time image of the body of said user simultaneously, wherein the step of activating the image capture devices is carried out automatically as soon as the image of the body of the user is included within said acquisition zone.

Since the image capture procedure is preferably applied to the naked body of the user in order to increase detail resolution, advantageously, the system according to the present invention comprises a dressing compartment which is arranged upstream of the opening and which allows the acquisition chamber to be accessed.

According to a preferred variant embodiment, the dressing compartment is divided in two sub-compartments by means of an internal bulkhead.

Each sub-compartment has an entrance, and the internal bulkhead is movable between two different closed positions in such a way that the two sub-compartments can alternately communicate with the opening.

The configuration of the dressing compartment as just described above can speed up the use of a single acquisition unit by two users who are undressing/dressing almost simultaneously in the two sub-compartments.

This aspect is particularly advantageous in combination with the reduced acquisition time because it allows users to be "virtualized" in a short time.

In order to improve the details of the virtual template and get more information by the acquisition process, according to an improvement of the system of the present invention, the acquisition chamber is provided with a floor platform comprising a sensor for measuring the weight of the user and indicator members for the positioning of the user.

Weight measurement may advantageously be stored into the remote unit—described later—in order to associate this value to the user's profile to be created.

It is clear that the system just described above enables the creation of a true user data management platform whose features will be illustrated and described hereinbelow.

In order to obtain a user data management platform, the resulting virtual template has to be stored so as to allow the corresponding user to change and manage it as required.

Therefore, advantageously, the system according to the present invention comprises a remote unit which is connected to the acquisition unit for storing the virtual template of the user.

The remote unit comprises a graphical interface comprising controls for operating functions adapted to handle the virtual template.

Eventually, according to a further embodiment, the acquisition unit comprises a detection unit for detecting the movements of the user.

Such a detection unit may be incorporated within the acquisition unit, or the acquisition unit may comprise means for connection to said detection unit.

This detection unit allows a 4-D template to be obtained, and it may be based on known technologies, such as Kinect, RealSense or Motion Capture, which can detect the movement of a user in real time.

These and other features and advantages of the present invention will appear more clearly from the following description of certain embodiments illustrated in the accompanying drawings, wherein:

FIG. 1 shows a view of the acquisition unit of the system according to the present invention;

FIG. 2 shows a detail of the acquisition chamber of the acquisition unit;

FIGS. 3a and 3b show two views of a specific embodiment of the system according to the present invention;

Figure 6:
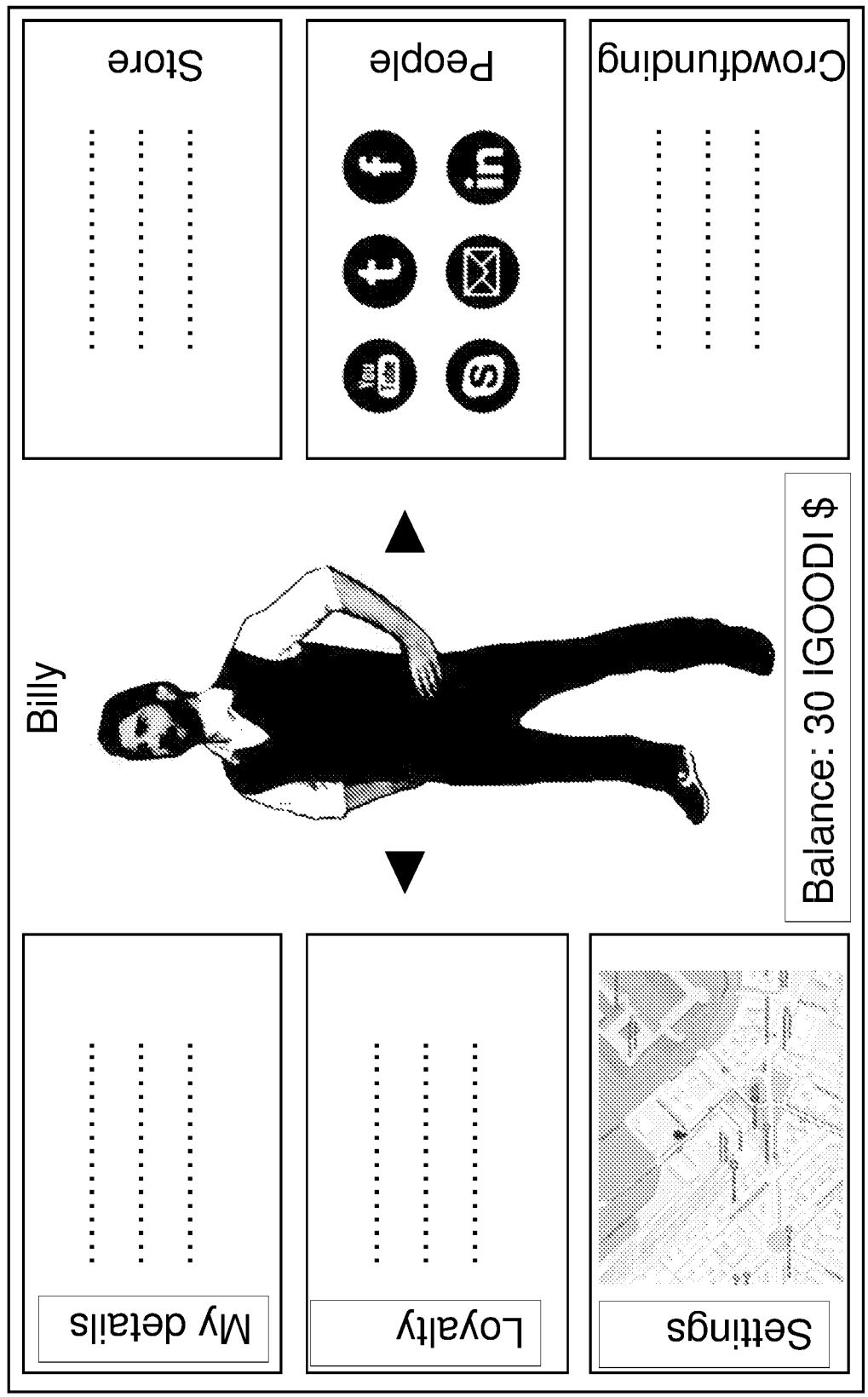

FIGS. from 5a to 5d illustrate some exemplary general screenshots of the process for generation of a virtual template as carried out by the system according to the present invention;

FIG. 6 shows a view of a graphical interface of the system according to the present invention.

It should be noted that the figures accompanying the present patent application are set forth to better understand the advantageous features of the system according to the present invention.

Therefore, these embodiments are to be construed as merely illustrative and not limitative of the inventive concept of the system and method according to the present invention.

Furthermore, while the exemplary embodiments illustrated herein refer to the body of a user, it is clear that the system according to the present invention can obtain virtual templates from parts of bodies of users and animals as well as from objects.

In fact, from the description just above, it is clear that the system according to the present invention can be modified in order to accommodate the needs of any user.

Thus, the system according to the present invention primarily aims to provide a user profile management platform through which a user can gain access to services available on the Internet and make use of a virtual template of his/her body as generated by the system according to the present invention to perform various activities.

Particularly referring to FIG. 1, the system for generation of a virtual template according to the present invention comprises at least one acquisition unit 1 consisting of a structure which defines an acquisition chamber 11 and which comprises a plurality of image capture devices 12, such as cameras or the like.

Particularly, the structure consists of a frame for supporting a plurality of panels 13 which are arranged in such a way that the acquisition chamber 11 is shaped as an egg.

FIG. 1 shows clearly the egg-shape of the acquisition chamber 11, as also suggested by the envelope of the outer surfaces of the panels 13.

Particularly, the panels 13 in the acquisition unit 1 are arranged on the support frame at different slopes: each panel 13 has a different slope with respect to the remaining panels 13, at least along one direction with reference to a Cartesian x-y-z-coordinate system.

Therefore, the egg-shaped is a direct consequence of such a specific arrangement of the panels 13, but this is not essential for the implementation of the system according to the present invention.

The acquisition unit 1 is also provided with an opening 14 which allows a user to enter in order to start the virtual template generation process which will be detailed hereinbelow.

During the acquisition procedure, the opening 14 can be closed in any manner known in the art but preferably by means of a curtain—not shown in the figures.

Therefore, the support frame supports the various panels 13 in such a way as to form an egg: this shape is obtained by arranging the panels on several parallel rings with respect to the vertical axis of the acquisition unit 1.

Each ring has a different diameter so that all the panels 13 belonging to one ring have an identical slope with respect to the vertical axis but a different slope with respect to the panels 13 belonging to the other rings.

The panels 13 can be different in shape and size, as long as they allow the egg-shape to be formed.

According to the example shown in FIG. 1, the panels 13 are rectangular or trapezoidal in shape and have an image capture device 12 arranged at the centre thereof.

Incidentally, it is not necessary that each panel 13 has an image capture device 12, the image capture devices being arranged in such a way as to obtain the best compromise between the number of devices 12 and the quality of the three-dimensional template.

The particular arrangement of the panels 13 in which each panel 13 has a different slope with respect to the other panels 13 can be achieved in such a way that the imaginary line joining each camera with the corresponding focal point has a given angle.

Thus, advantageously, the panels 13 are arranged in such a way that the imaginary line joining a given camera with the corresponding focal point is tilted at an angle in the range from 25° to 50° with respect to the imaginary lines associated to the cameras arranged on panels 13 which are adjacent or most proximal to that having the given camera.

Each panel 13 is separated from the adjoining panels by a space which surrounds the periphery of the panel 13 and which is advantageously provided with a light source consisting of LED strips 131, as illustrated in FIG. 2.

In addition, FIG. 2 shows a detail of two panels 13 which are provided within the acquisition unit 1 according to a preferred embodiment.

With reference to FIG. 2, the uppermost panel 13 is provided with an indicator member 15 adapted to indicate to the user the proper positioning within the acquisition chamber 11.

Preferably, the member 15 may consist of one or more lights indicating to the user a reference point—based on the height of the user—to maintain a proper posture within the acquisition chamber.

Furthermore, the uppermost panel may also have a presence sensor 16 which detects the presence of the user and starts the acquisition procedure.

As will be seen hereinbelow, the acquisition procedure occurs through an interaction between an interface 17 and the user.

Preferably, the interface 17 consists of a screen 17 which shows to the user various instructions to be executed during the acquisition procedure.

Furthermore, advantageously, the acquisition chamber 11 is provided with a floor platform 18 which comprises a sensor for measuring the weight of the user and indicator members for the positioning of the user—not shown in the figure.

Particularly, these indicator members are related to clues on the floor for the positioning of the feet of the user.

In addition to the indicator members, the floor platform 18 may comprise additional light sources adapted both to indicate or delimit the position for the user and to increase the light intensity within the acquisition chamber 11 in order to achieve the best conditions for capturing images.

In addition to the ability of measuring the weight of the user, according to an exemplary embodiment, the acquisition unit also comprises a device adapted to sense biometric parameters from the user.

The biometric parameter sensing device may be incorporated within the acquisition unit or, alternatively, the acquisition unit may comprise communications means adapted to communicate with any additional biometric parameter sensing device.

This variant embodiment can both increase the amount of data available to the system and improve the accuracy in generation of the virtual template.

Furthermore, when the biometric parameter sensing device comprises an electrocardiograph or a blood pressure meter, for example, the virtual template generated by the system according to the present invention can vary according to the body conditions of the user, which is particularly valuable in both medical and sport fields.

FIGS. 3a and 3b show two views of a preferred embodiment of the acquisition unit 1.

According to these embodiments, a dressing compartment 2 is provided which is attached to the acquisition unit 1 at the opening 14 so as to communicate with the acquisition chamber 11.

As shown in FIG. 3a, the dressing compartment is divided in two sub-compartments 21 and 22 by means of an internal bulkhead 3.

Each sub-compartments 21 and 22 has an entrance 211, 222.

The internal bulkhead 3 is movable between two different closed positions in such a way that the two sub-compartments 21 and 22 can alternately communicate with the opening 14.

Particularly, the internal bulkhead 3 is hinged to a wall of the dressing compartment 2 and, as shown in FIG. 3a, when the internal bulkhead 3 is rotated, the internal bulkhead is abutted against the edges of the opening 14

Hence, according to the configuration in FIG. 3a, the internal bulkhead 3 closes the sub-compartment 21 in such a way that a user entering through the entrance 222 can access the acquisition chamber 11 without coming across or seeing another user who is undressing or dressing in the sub-compartment 21 before or after the acquisition procedure.

Figure 4:
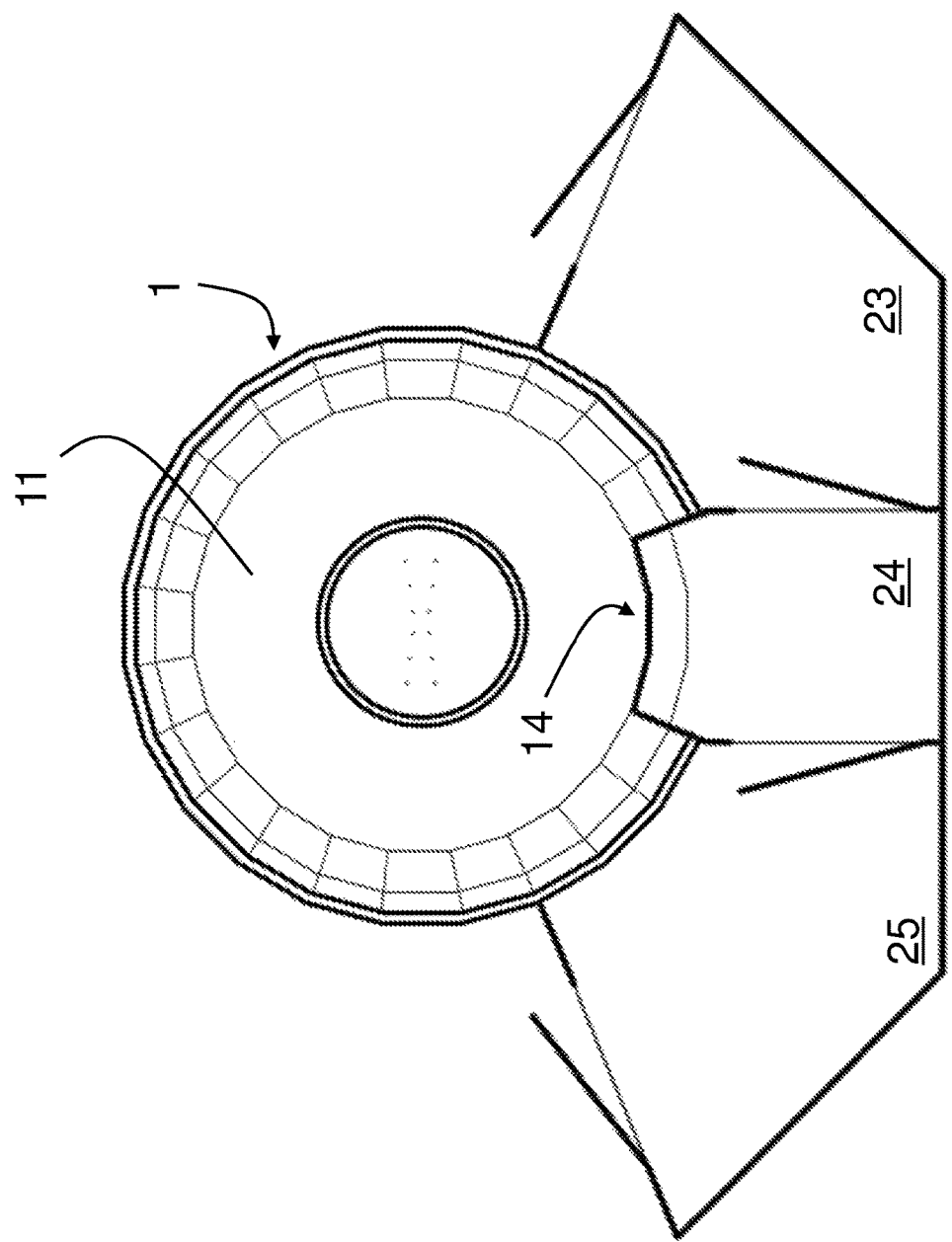
FIG. 4 illustrates a further embodiment of the system according to the present invention.

FIG. 4 shows a further exemplary embodiment of the dressing compartment 2.

In this case, the dressing compartment 2 is divided in three sub-compartments 23, 24 and 25 in such a way that the sub-compartments 23 and 25 communicate with the outside through a corresponding opening and communicate with the sub-compartment 24 through a corresponding further opening.

Each user can access the opening 14 of the acquisition unit 1 through the sub-compartment 24 which communicates only with the sub-compartments 23 and 25 and not directly with the outside.

Again, as in the case of the dressing compartment of FIGS. 3a and 3b, users can alternately access the sub-compartment 24 and therefore get inside the acquisition unit 1 only one at a time, thereby ensuring the privacy of each user.

It is even possible to include mechanized opening means for the sub-compartments 23 and 25 in such a way as to allow only one of the two sub-compartments to communicate with the compartment 24 at a time while disabling the communication between the other sub-compartment and the sub-compartment 24.

As will become more apparent from the description of the acquisition procedure, the acquisition unit 1 may be connected to a remote unit for storing the virtual template of the user.

For example, the remote unit may be a server or a workstation or a portable device, such as a smartphone or the like.

However, preferably, the remote unit has a graphical interface comprising controls for operating functions adapted to handle the virtual template, an example of which is illustrated in FIG. 6.

The system according of the present invention may also comprise more than one acquisition unit which may be installed in different places so as to facilitate the scanning of different users.

Obviously, all the acquisition units will be connected to a single remote unit so as to create a community of virtual templates or avatars related to the user, wherein each avatar is managed by a management platform.

The acquisition unit 1 may also comprise means to allow the acquisition unit to be easily moved, such as wheels externally mounted at the bottom of the acquisition unit 1.

Finally, it is possible to provide an authentication means 19, illustrated in FIG. 3b, which is adapted to authenticate users getting inside the acquisition chamber—FIG. 1—or the dressing compartment 2—FIGS. 3a and 4.

Figure 5A:
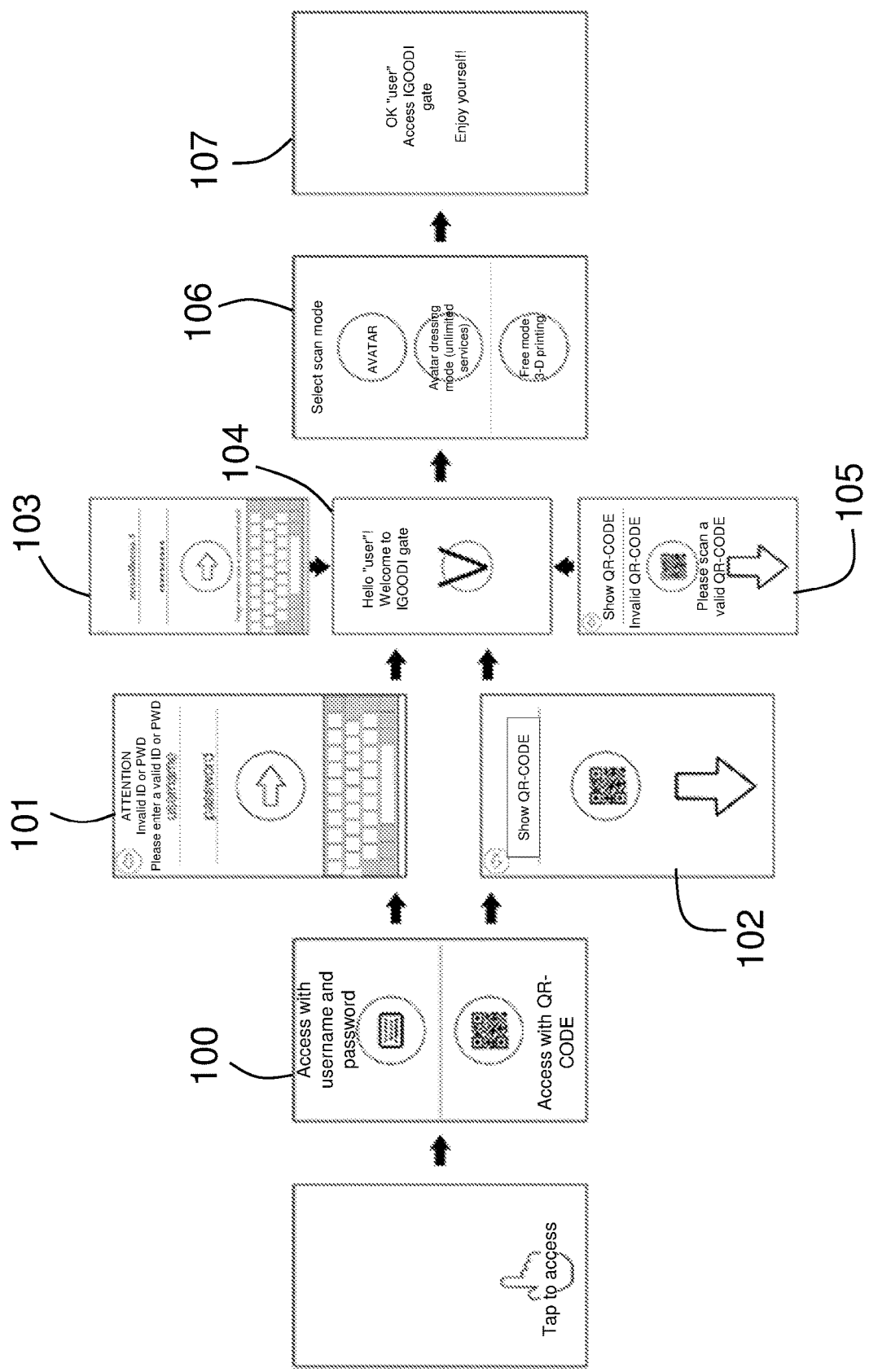

Such an authentication means 19 may be used at the beginning of the acquisition procedure, as shown in FIG. 5a.

Particularly, FIG. 5a shows some screenshots of a software application which may be installed either into a mobile device or into the authentication means 19 so as to ensure a secure access for a user.

If the user is a registered user—step 100—than the user enters his/her username and password and accesses the acquisition chamber 11.

If the user is not a registered user, then the user registers himself/herself by filling forms of a known type in order to obtain a username and password.

Once logged in, the user can start the acquisition procedure, 106, 107.

It should be noted that access may also occur automatically, i.e. without having to enter username and password.

For example, it is possible to provide a QR code or bar code which identifies the user uniquely and which can be used to gain an immediate access.

Figure 5B:
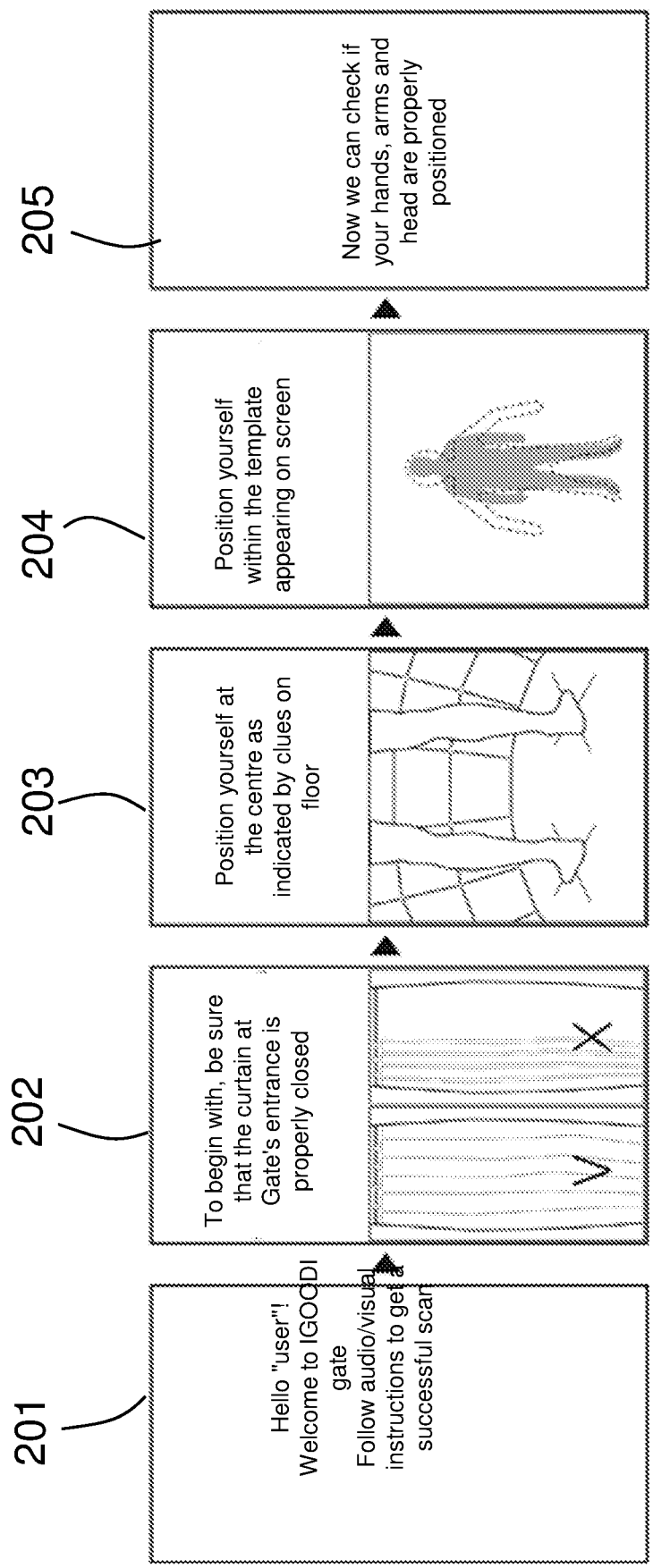
Figure 5C:
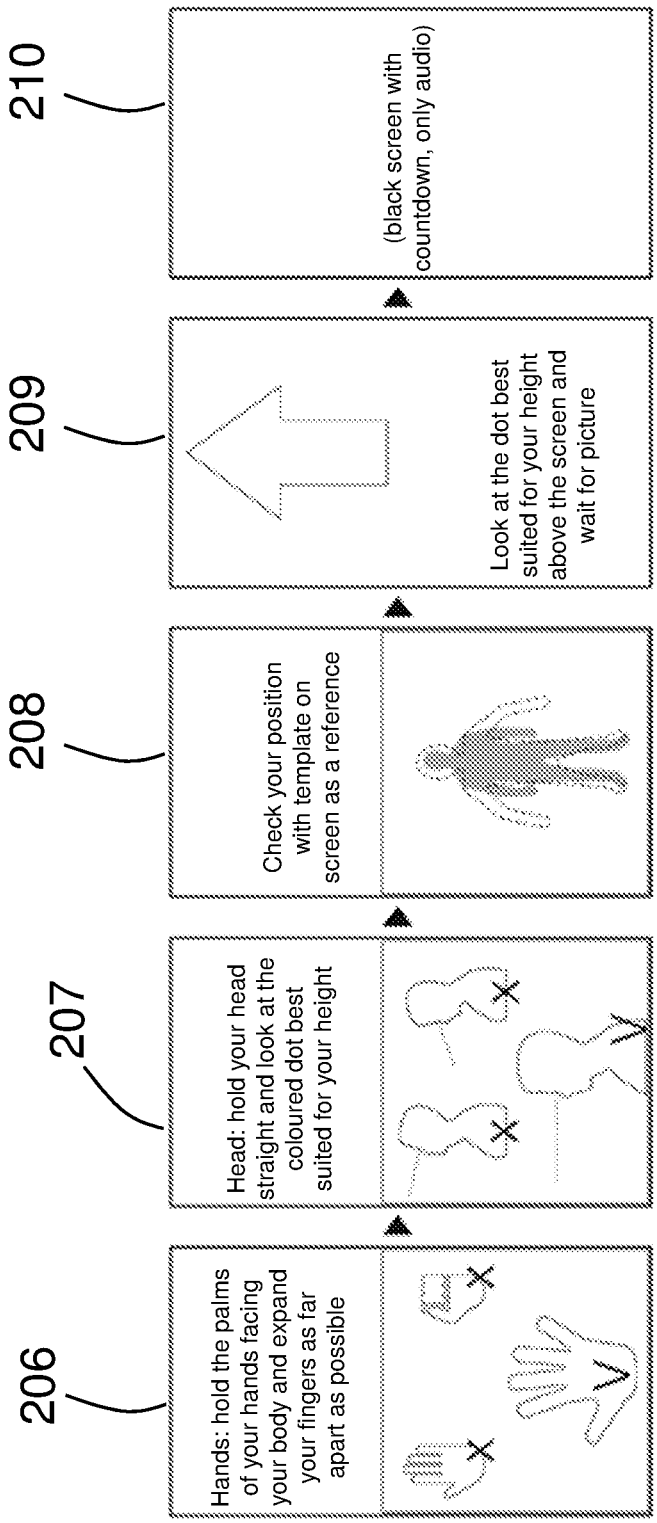
Figure 5D:
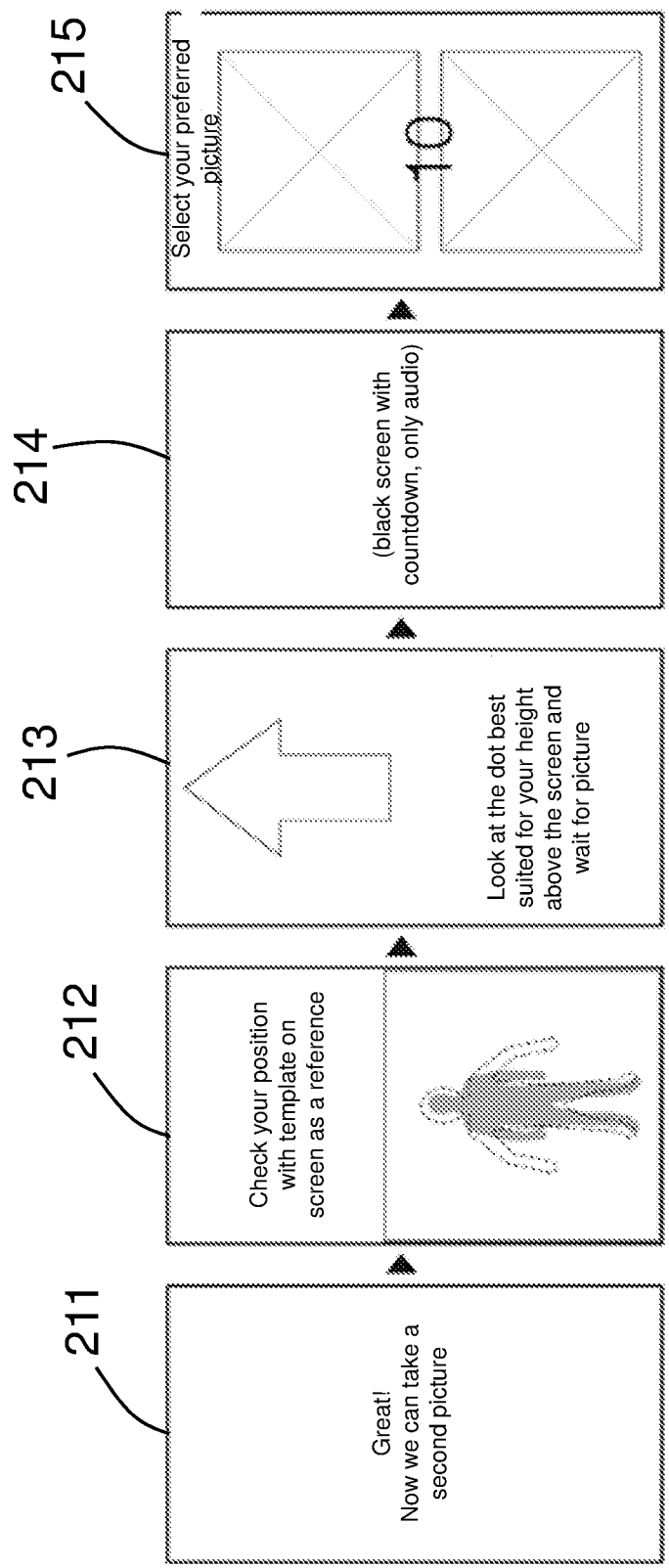

FIGS. 5b to 5d illustrate an exemplary acquisition procedure.

As anticipated, the acquisition procedure may preferably follow predetermined instructions which are visualized to the user through the interface 17.

The interface 17 can be turned on as soon as the presence sensor 16 detects the presence of the user.

The interface 17 is preferably controlled by a control unit which is programmed to carry out the acquisition procedure through the generation of instructions.

These instructions can be also acoustic in nature.

As is apparent from the screenshots of FIGS. 5b, 5c, 5d, these instructions are related to the positioning of the limbs of the user as well as to various postures to be held in order to increase acquisition accuracy.

The instructions given to the user are listed below:

checking that the opening 14 is properly closed by the corresponding curtain, 202, checking the proper positioning of the feet, 203, generating a shape adapted to define an acquisition zone and visualizing both said shape and a real-time image of the body of the user simultaneously, as denoted by reference numeral 204.

As will be described later, the shape may represent an "audio-video tutorial" adapted to give instructions to the user.

In this way, the user receives a feedback and, as soon as the image of his/her body is included within the acquisition zone, the system could also activate the different image capture devices automatically in order to obtain the virtual template.

Automatic activation can occur through the image capture device handling software application according to different modes based on the type of device in use.

In the case of SLR cameras, the image capture software application makes use of specific libraries for management thereof. Particularly, the software application allows the settings of multiple cameras to be simultaneously managed.

The software application logic makes use of an image capture & download script which is run on a per camera basis, the script carrying out the following tasks:

querying the cameras to check the status thereof (operation, exposure, ISO, etc.)

synchronizing the clocks of the cameras, capturing images with a delay calculated in order to achieve a perfect synchronization.

As an alternative, the images can be captured with the use of industrial sensors, such as video cameras or the like.

The image capture software application makes use of specific libraries for management thereof. Particularly, the software application allows the settings of multiple sensors to be simultaneously managed.

The software application logic makes use of an image capture & download script which is run for all the cameras simultaneously, the cameras being continuously in capture mode.

According to a variant embodiment shown in FIGS. from 5b to 5d, the generation of the virtual template can be preceded by additional steps:

checking the position of user's head and hands, as denoted by reference numerals 205, 206 and 207. The user is instructed on how to keep his/her hands, 206, and how to orient his/her head, 207 (in this case with the help of the above-described reference members 15).

checking that the image of the body is included within the acquisition zone, 208 activating the image capture devices, 209 and 210.

Lastly, according to the embodiment illustrated in FIG. 2d, it is possible to capture another image, 211-214, so that the user can choose which image to use for generation of the virtual template, 215.

Once all the instructions have been complied with, the acquisition unit 1 carries out the scanning process and the system generates a three-dimensional template with the use of common algorithms known in the art, such as for example photogrammetry algorithms.

From the above description, it is clear that this system allows the entire virtual template generation process to be automatized, from the registration of the user to the generation of the ultimate virtual template, depending on the features of the system according to the present invention.

This automation is achieved by activating the image capture devices following the recognition of certain positions of the user within the acquisition chamber 11.

It can be envisaged that the cameras intended to frame the hands and/or face of the user can capture images with a greater resolution than the remaining cameras.

According to an exemplary embodiment, a means is provided to adjust the light intensity of the above-described light sources.

This adjustment means can be used to set the light intensity depending on the conditions existing in the acquisition chamber 11 in order to improve the success of the cameras in capturing images.

Thus, the adjustment means can be controlled manually.

Alternatively, this adjustment means can be controlled automatically, for example, it can be operated by the control unit to change the light intensity within the acquisition chamber 11 during the imagine capture procedure.

In this case, it is possible to provide a feedback system having sensors adapted to detect the light intensity within the acquisition chamber 11.

Therefore, the entire system can be coordinated by the control unit which not only gives instructions to the user and operates the cameras, but also adjusts the light intensity according to the operational needs.

For example, it may be envisaged that the user gets inside the acquisition chamber 11: the weight sensor or presence sensor detects the presence of the user, the control unit gives instructions to the user and operates the light sources so as to obtain a light intensity sufficient to allow the height of the user to be appropriately measured and the necessary images to be captured.

During the image capture procedure, the light intensity level can obviously vary depending on the position of the user, the clothing of the user and/or the general conditions of the acquisition chamber 11.

In the system according to the present invention, it may also be envisaged that a user can load a scanned image of his/her body captured by means of a capture system of any type so that the system can subsequently process it according to the features which will be described hereinbelow.

At this time, each user can manage his/her three-dimensional template through his/her profile.

Advantageously, the template may have 4D-features, i.e. time can be added as a parameter: for example, this can be obtained with the use of known technologies, such as Kinect or RealSense, which allows the movements and gestures of a user to be captured in real time and associated to the corresponding virtual template.

The management of the template or avatar of a user can be easily obtained through the implementation of the graphic interface, an exemplary embodiment of which is illustrated in FIG. 6.

FIG. 6 shows an exemplary embodiment of the graphical interface through which the user can manage his/her avatar and, from this figure, it can be understand that the system according to the present invention provides a true platform to manage the profile of each user on the Internet.

The interface shows the scan image captured by the acquisition unit 1 at the centre, and various services which each user can access at the sides.

Each user can use such a graphical interface to access his/her virtual fitting room in which he/she can try any item intended to be bought online.

As it has been discussed above, the system according to the present invention has indisputable advantages in fashion field.

When a user intends to purchase an item of clothing online, he/she can visit the website of the store, select the item, and try it within the virtual fitting room in the private area of the system according to the present invention.

The online store website or the browser used to access it can be provided with a suitable control, for example a button, which allows the user to collect the items of interest into his/her private area simply by pressing the button.

As soon as the user accesses his/her private area, he/she will find the selected items and could try them within the virtual fitting room.

Alternatively or additionally, in order to further increase the loyalty in the user, it may be envisaged that the user can try an item and match it to other previously purchased items even at the physical store, avoiding queues and time waste, for example by using a ticket having a QR-code printed thereon.

It is particularly clear that this variant embodiment allows a user to purchase an item directly, without concerns about the size.

According to one embodiment of the system according to the present invention, it is possible to provide algorithms for calculating predetermined parameters of the body of the user.

Thus, algorithms can be provided to automatically calculate body parameters or measures depending on the services to be used.

For example, algorithms can be provided to automatically determine the size of a dress based on the virtual template and, preferably, to visualize the equivalents of the size for each country.

Therefore, when the dress is purchased online, the user can choose among the various (e.g. American, French, English or Italian) size equivalents visualized on the screen of the interface and buy the dress without further delay.

The advantages are not limited to online shopping; as one alternative, the user selects or simply identifies a dress of interest to him/her, the system automatically determines the size required for that dress, and then the user goes to the store, selects the size as determined by the system and pays for the dress without the need for trying it.

Parameters which can be calculated include, for example, the length of the limbs, the circumference of the skull, the circumference of the waist, and the body mass.

This aspect is particularly advantageous because it allows a user to evaluate how wearable items fit to the virtual template of the body of the user.

With particular reference to the graphical interface shown in FIG. 6, it should be noted that, in section "People" on the right side with respect to the avatar, it is possible to access various social network websites.

In section "Store" on the upper right side with respect to the avatar, it is possible to access various online shopping services.

Particularly, a step may be included to evaluate how wearable items fit to the virtual template of the body of the user.

In this way, the system can automatically determine the size of the user, for example, and the user can access the section "Store" to visualize a number of items for which his/her size is available.

Moreover, once the wearable item has been selected, whether it is a dress or a medical prosthesis, the system according to the present invention can fit it to the avatar of the user, i.e. model the item to make the avatar wear it.

Obviously, the graphical interface shown in FIG. 6 can be sized for use in portable devices such as smartphones, tablets or the like.

The invention claimed is:

1. A system for generation of a virtual template of at least one part of a body of a user and/or at least one part of an object, comprising:
    at least one acquisition unit (1), said acquisition unit (1) having a structure defining an acquisition chamber (11), said structure comprising a plurality of image capture devices (12),
    wherein:
    said structure has a frame adapted to support a plurality of panels (13), each panel having a different slope with respect to other panels,
    each panel (13) has, arranged thereon, a corresponding image capture device (12) facing said acquisition chamber (11), and
    the panels (13) are arranged in such a way that said acquisition chamber (11) is shaped as an egg,
    further comprising a control unit that communicates with a unit operating said image capture devices (12), said control unit being provided with a processor configured to run a logic program which comprises the following steps:
    a) generating instructions for said user to obtain a proper positioning of the user within the acquisition chamber (11);
    b) activating the image capture devices (12); and
    c) generating a virtual template of said user,
    wherein the step a) comprises the following sub-steps:
        a1) generating a shape adapted to define an acquisition zone, and
        a2) visualizing both said shape and a real-time image of the body of said user simultaneously,
    step b) being carried out automatically as soon as the real-time image of the body of said user is included within said acquisition zone.

2. The system according to claim 1, wherein some of said panels (13) are provided with a light source.

3. The system according to claim 2, wherein said light source consists of light members (131) arranged at edges of said panels (13).

4. The system according to claim 1, wherein at least one panel (13) is provided with an interface unit (17) interfacing with said user.

5. The system according to claim 1, wherein at least one panel (13) is provided with an indicator member (15) adapted to indicate to the user a proper positioning of the user within said acquisition chamber (11).

6. The system according to claim 1, further comprising a dressing compartment or closet (2), which communicates with said acquisition chamber (11) through an opening (14),
    said dressing compartment (2) being divided in two sub-compartments (21, 22) by an internal bulkhead (3), each sub-compartment (21, 22) being provided with an entrance (211, 222), and
    said internal bulkhead (3) being movable between two different closed positions in such a way that the two sub-compartments (21, 22) can alternately communicate with said opening (14).

7. The system according to claim 1, wherein said acquisition chamber (11) has a floor platform (18), said floor platform (18) comprising a sensor that detects a weight of the user and indicator members for a positioning of said user.

8. The system according to claim 1, further comprising a remote unit, which is connected to said at least one acquisition unit (1) in order to store a virtual template of said user,
    said remote unit comprising a graphical interface which comprises controls that operate functions adapted to handle said virtual template.

9. The system according to claim 1, wherein said at least one acquisition unit comprises a detection unit that detects movements of said user.

* * * * *